Jan. 24, 1939.        R. N. FALGE        2,144,838
HEADLIGHT TESTER
Filed Nov. 24, 1934        4 Sheets-Sheet 2
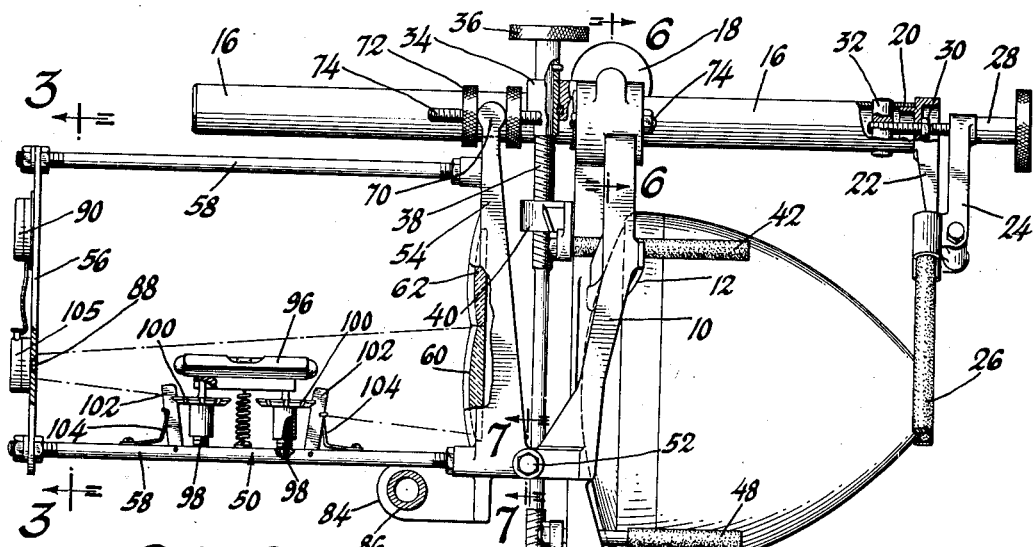
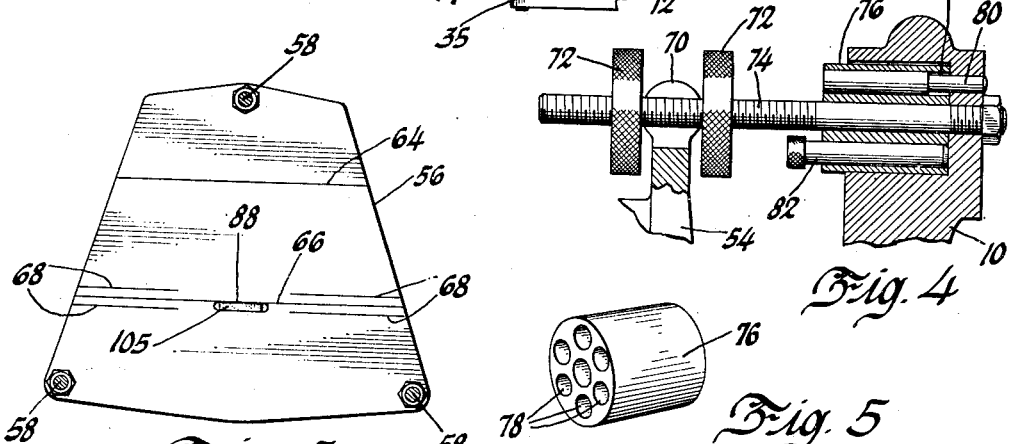
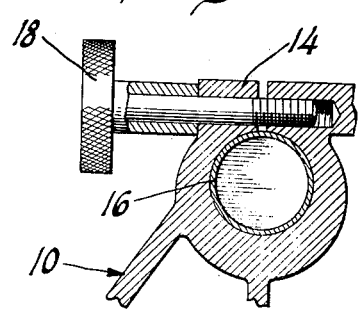
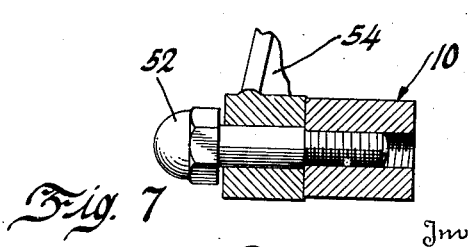
Inventor
Robert N. Falge
By Blackmore, Seavey & Hink
Attorneys Jan. 24, 1939.　　　　R. N. FALGE　　　　2,144,838
HEADLIGHT TESTER
Filed Nov. 24, 1934　　　　4 Sheets-Sheet 3

Inventor
Robert N. Falge
By Blackmore, Spencer & Flint
Attorneys

Jan. 24, 1939. R. N. FALGE 2,144,838
HEADLIGHT TESTER
Filed Nov. 24, 1934 4 Sheets-Sheet 4

Inventor
Robert N. Falge
By Blackmore, Sweer & Hirt
Attorneys

Patented Jan. 24, 1939

2,144,838

UNITED STATES PATENT OFFICE 2,144,838

HEADLIGHT TESTER

Robert N. Falge, Anderson, Ind., assignor to General Motors Corporation, Detroit, Mich., a corporation of Delaware Application November 24, 1934, Serial No. 754,562

21 Claims. (Cl. 88—14)

This invention has to do with equipment for testing a headlamp to determine whether it is functioning efficiently, whether the filament or other light source is in proper position with respect to the focus of the reflector, and whether the headlamp is properly aimed down the road.

The apparatus consists essentially of a supporting structure which is preferably designed to be mounted on the headlamp and which carries the testing device which incorporates condensing lenses for projecting images of the beam on a screen rigidly connected to the lens holder and spaced but a foot or so in front of it. The testing apparatus is adjustably mounted on the support to permit projection of the images in the desired relation to reference marks on the screen. The advantage of incorporating the screen in the testing device is that the entire operation may be performed with no more floor space than is ordinarily available ahead of a parked car in a service station.

An important feature of the invention consists in the fact that the main lens condenses into an image on the screen the greater part of the light output of the headlamp. Prior devices have made use of but small bundles of rays of light from selected parts of the lamp, and often these bundles of rays have been subject to errors which make them unrepresentative of the beam as a whole. This type of error is avoided in the present construction by intercepting substantially all rays which might be directed into the upper part of the beam.

Another advantage of lenses resides in the fact that the images on the screen are of such brilliance owing to the condensing action of the lens that they can readily be seen in daylight without resorting to cowling of the screen.

One of the above described devices is preferably provided for each of the headlamps, and each is equipped with means to receive a bar extending crosswise of the vehicle to locate the horizontal axes through the centers of the faces of both lamps in a plane substantially at right angles to the longitudinal axis of the vehicle.

I have also preferably incorporated in the testing equipment means for measuring the intensity of the light from some part of the image. This may take several forms, but I prefer to simply slot the screen at the center of the image, and arrange behind it some type of light measuring instrument, preferably a photoelectric, light sensitive cell equipped with an indicating ammeter. The readings of the ammeter are not only helpful in determining whether the light output of the lamp is as good as it should be, but also in affording an indication of whether or not the bulb is properly focused in the headlamp.

Many variations will occur to those skilled in the art, and for a complete description, reference is made to the accompanying drawings.

Figure 2 is a side elevation, partly in section, of one of the testers.

Figure 3 is a section on line 3—3 of Figure 2.

Figure 4 is a section on line 4—4 of Figure 1.

Figure 5 is a perspective view of the spacing cylinder of Figure 4.

Figure 6 is a section on line 6—6 of Figure 2.

Figure 7 is a section on line 7—7 of Figure 2.

Figure 1:
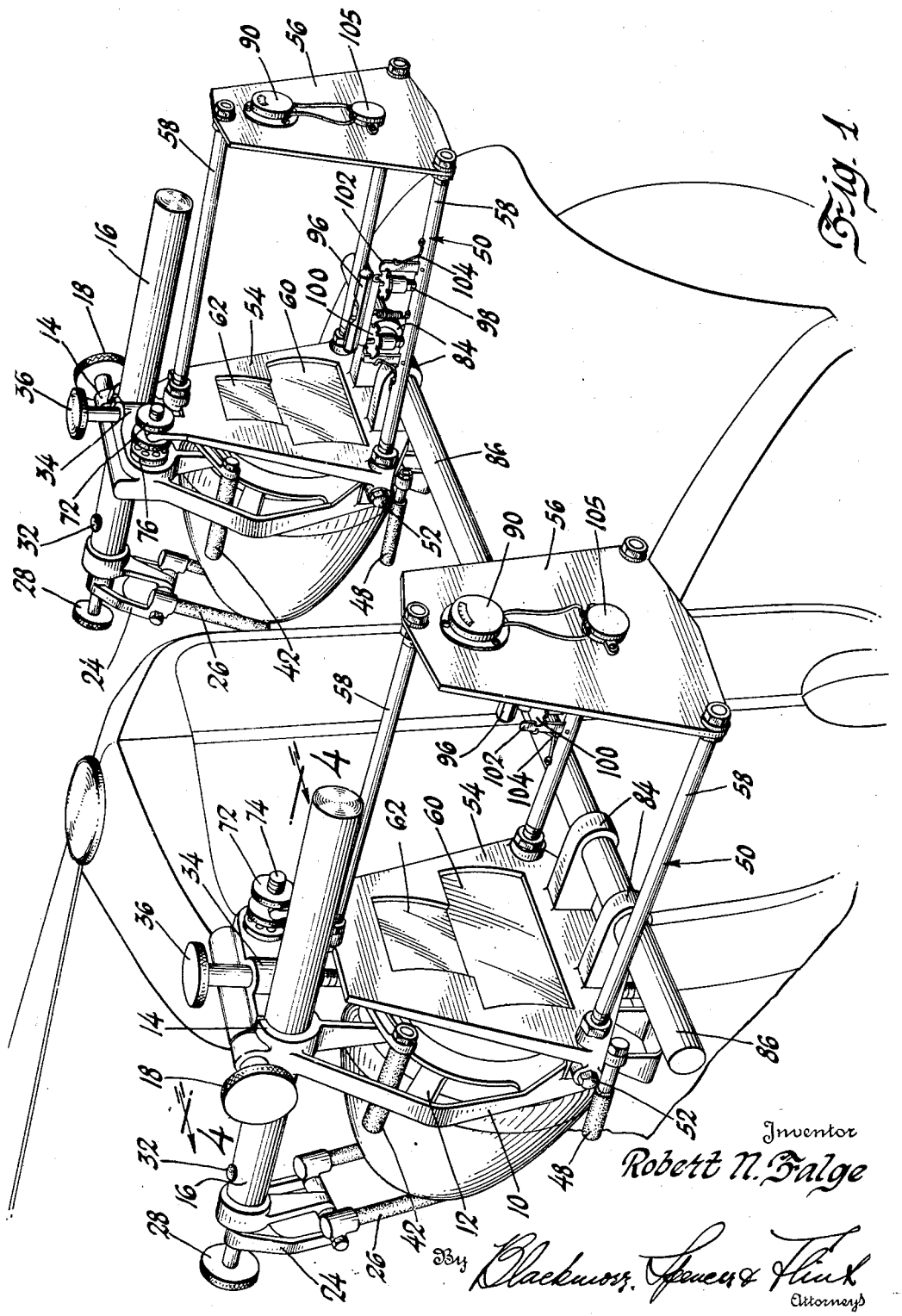
Figure 1 is a perspective view showing a pair of headlight testers mounted on headlamps as they would appear in the final stages of the test.
Figure 8:
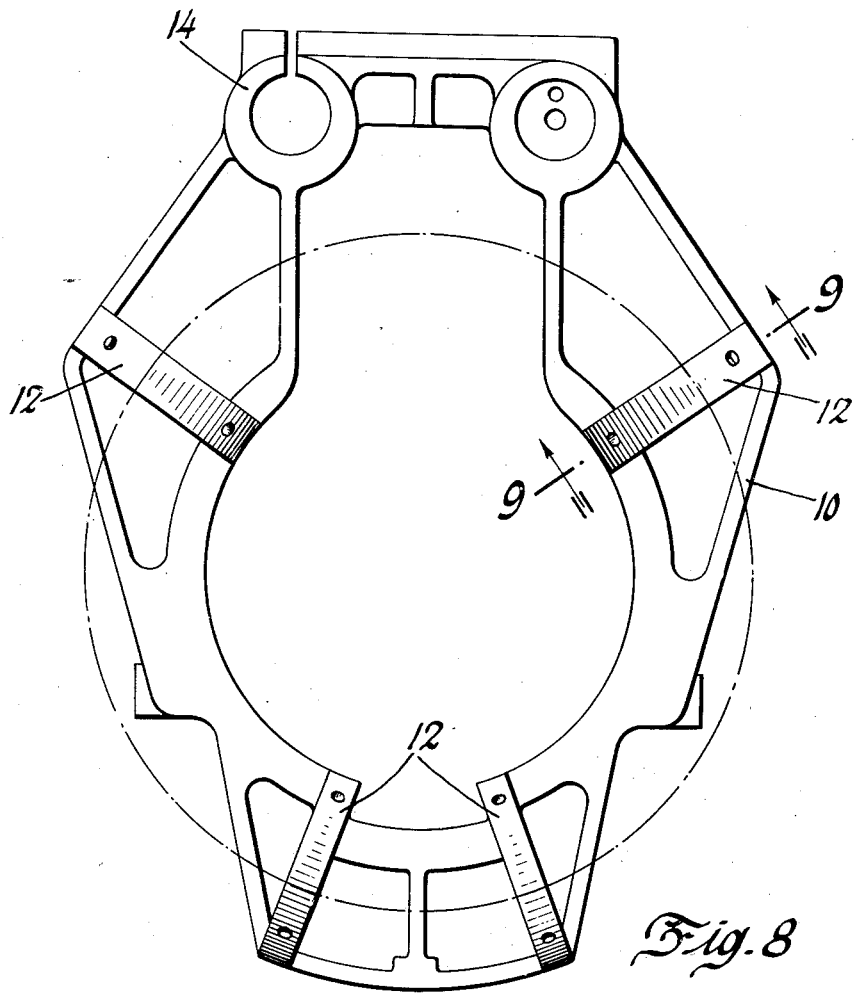
Figure 8 is a detail of the supporting frame showing the lamp rim engaging side.
Figure 9:
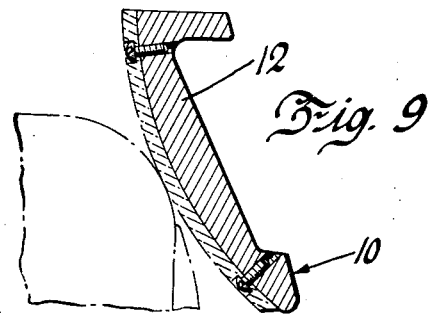
Figure 9 is a section taken on line 9—9 of Figure 8.

In the preferred form of the invention, the testers are supported by the lamps themselves. However, in cases where it would not be feasible to clamp the devices on the lamps, the construction could be equipped with supports extending to the floor.

The supporting structure comprises a frame 10 which is preferably in the form of a casting. The frame is equipped with radially extending centering fingers 12 against which the door of the lamp is intended to register. The frame 10 is provided at its upper portion with a split bearing 14 adapted to slidably receive a tube 16. The tube may be clamped in place by tightening bolt 18, Figure 6. Bar 16 is hollow and within its rear end slidably receives a collar 20 having integral therewith a downwardly and sidewardly extending arm 22 to the lower end of which is pivoted a frame 24 carrying downwardly extending clamping fingers 26 adapted to engage the rear end of the lamp housing. The upper part of member 24 is apertured to receive an adjusting screw 28 having a knurled end to enable it to be easily manipulated. The end of the adjusting screw bears against some part rigid with the member 16 so that by rotating the screw 28 the member 24 with its fingers 26 may be swung toward or from the lamp housing. In the specific construction illustrated the inner end of screw 28 bears against the head of bolt 30 which passes through an aperture in collar 20 and engages a threaded passage in anchoring stud 32 which passes through alined holes in the member 16. The bolt 30 serves to hold the member 20 in place.

Supporting frame 10 likewise carries at its upper portion a bearing 34 and at its bottom portion a bearing 35 in which is mounted for rotation only an adjusting screw 36. This screw has right and left hand threaded portions. The upper threaded portion 38 is received in a threaded aperture in a yoke 40 carrying two spaced fingers 42 adapted to engage the top of the headlamp at either side of its center line. The bottom threaded portion 44 is received in a threaded aperture in a yoke 46 carrying fingers 48 adapted to engage the bottom of the headlamp housing on either side of the center line. Fingers 12, 26, 42 and 48 are preferably covered with some kind of relatively soft material such as fiber to prevent scratching of the headlamp housing. The space in the center of the screw 36, between the two threaded ends, is covered with rubber, or other soft material, to accommodate heavily convex lenses which are too deep to contact fingers 12.

With the construction described it will be apparent that by adjusting the screw 28 the headlamp is clamped between the fingers 12 and the fingers 26, and by adjusting the screw 36 the headlamp is clamped between the fingers 42 and 48. In this way the supporting frame is centered with respect to the lamp housing.

The testing device consists of lens holding frame 54 and screen 56 held in spaced parallel relation with each other by means of rods 58 provided at their ends with suitable nuts and lock nuts. The frame 54 carries lenses 60 and 62. Each of the lenses is in the form of a horizontal cylindrical prism. The lower lens 60 is the larger, and is of sufficient width and depth to encompass substantially the entire portion of the light from the headlamp that forms the top of the beam. This light comes from the central horizontal zone of the headlamp in conventional constructions. The smaller lens 62 is for use in aiming old-style, single-beam headlamps in which the light which forms the top of the beam may come from near the top of the headlamp.

It will be noted from Figure 3 that the screen bears at its upper portion a reference line 64, and at its lower portion a reference line 66 at either side of which are located parallel limit lines 68. Reference lines 64 and 66 are used in aiming the beam. Limit lines 68 are used in focussing the beam.

As shown in Figure 3, I have provided an aperture 88 at the center of and with its upper edge on reference line 66, behind which is a light sensitive cell 105 connected to micro-ammeter 90. The cell converts the light into electrical energy, and the amount of the energy is measured by means of micro-ammeter 90. I have preferred to locate the opening 88 in the position shown because here the two hot spots from the sides of the reflector in the conventional headlamp are somewhat separated and the amount of light received by the cell depends not only on the light output of the headlamp, but also upon the accuracy of focussing so that the readings of the ammeter provide a test of focussing as well as a measure of light output.

Testing device 50 is attached to supporting frame 10 through aligned horizontal pivots 52, one of which is shown in detail in Figure 7, thereby permitting angular adjustment of the testing device with reference to the headlamp in the vertical plane. Lens carrying frame 54 is provided with an upwardly extending bifurcated arm 70 arranged to receive threaded rod 74 which is fixedly secured to supporting frame 10 and which carries nuts 72 for clamping the testing device in any desired position with reference to the lamp face. Through this means, the level of the beam pattern on the screen may be adjusted readily with reference to reference lines 64 and 66.

Upon the member 74 is slidably mounted a cylindrical member 76 having apertures 78 about its periphery. One end of these apertures is adapted to receive pin 80 which serves to lock the cylinder against rotation on stud 74. The different apertures are provided with spacer pins of different length. By drawing the cylinder out and rotating it, any one of these spacers 82 may be made to register against pin 80. These spacers serve to limit the inward movement of adjusting nut 72 and permit the mechanic to pre-set the angle of the testing device 50 with reference to the supporting frame 10. One aperture is left without a spacer such that the cylinder may slide to its rearmost limit and be out of the way. The length of the spacers is such that they serve to change the angle of the testing device by definite steps, say one-half degree apart. In use, the device would be supplemented by a list of the different headlamps and the spacer to be used with each. The spacer length for a given headlamp would be such that the beam pattern on the screen would register within substantially one quarter of one degree of the correct level when all of the optical parts were in correct adjustment. Up and down focussing inaccuracies of headlamps of conventional design would be evidenced by deviations in the level of the top of the lower beam pattern from reference line 66. Should the upper level of the beam pattern fall outside limit lines 68, it would indicate that the light source was too inaccurately located up and down to be acceptable. In the case of a fixed-focus headlamp, the recourse is to reverse the bulb in the socket or try a different one. In the case of single-focus type headlamps, the same procedure may be followed as in the previous sentence if, after moving the bulb ahead and back until the beam pattern is properly concentrated, the top of the pattern still falls outside the limit lines. In the case of headlamps with double-focussing mechanisms, the procedure would be that of first concentrating the pattern with the axial focussing screw and then adjusting it to the correct level with the vertical focussing screw.

The lens carrying frame 54 is provided at the bottom with forwardly projecting bearings 84 adapted to receive tie bar 86. When tie bar 86 is in the position shown in Figure 1, the axes of the headlamps lie in vertical planes substantially parallel to the vertical plane through the longitudinal axis of the vehicle.

The apparatus so far described is sufficient for focussing the headlamp, but not for aiming, since the lamp, the supporting frame, and the testing device will function to test focussing whatever be the angle of the lamp axis to the horizontal. To permit aiming, I have provided on each of the devices a liquid level 96. This level is preferably supported on two adjusting nuts 100 mounted on threaded studs 98 fixedly secured to one of the supporting rods 58. As shown in Figure 2, the adjusting nuts are held against rotation by means of pivoted dogs 102 yieldingly urged into notches in the edges of the nuts by springs 104. By adjusting one of the nuts 100 up or down, the angle of the level 96 with reference to the horizontal may be adjusted as desired. I prefer to establish the pitch of the threads and the space between adjusting nuts so that the adjusting nuts may be divided into twelve equal parts, each part representing a change of angle of one inch in twenty-five feet.

I prefer to use the nut 100, nearest the target, to compensate for variations from the true horizontal in the floor on which the vehicle stands. By calibrating the pitch of the floor in each adjustment stall in terms of inches at twenty-five feet and marking the value on the rear wall of the stall, or other convenient place, it is a simple matter to duplicate the setting on the level adjusting nut and thereby refer the bubble in the level to the level of the floor on which the vehicle stands.

I prefer to use the nut 100, nearest the headlamp, to pre-set the liquid level for the angle at which it is designed to aim the top of the beam above or below the horizontal. For example, with the dog 102 registering in notch marked 0, the top of the beam would be horizontal when the bubble was centered and the vehicle was standing on a horizontal base. With the dog registering in notch marked −2, the top of the beam would be aimed two inches below the horizontal at a distance of twenty-five feet ahead.

Nut 100, nearest the lamp, may also be used to determine how much too high or too low, in inches at twenty-five feet, a given headlamp is aimed prior to adjustment, thereby aiding in the sale of adjustment service.

A single nut 100 would serve both purposes but would complicate the procedure somewhat.

Operation

The mechanic first polishes up the reflectors, cleans the lenses, replaces blackened bulbs and eliminates high resistance contacts in the electrical circuit.

He then lowers the testing device over the lamp and clamps it roughly in position between pads 12 and rods 42, 48 and 26. He then rotates the device about the lamp axis until threaded rod 38 is parallel with the vertical flutes on the lens. Thereafter, he clamps the device securely in position by tightening screws 28 and 36.

He then adjusts the testing device 50 about pivots 52 by means of adjusting nuts 72 until the light sensitive cell shows a maximum reading on the meter. If means is provided for moving the bulb ahead and back in the reflector, he adjusts the bulb ahead and back until the meter reading is a maximum. If no cell is provided, he merely adjusts the bulb ahead and back until the hot spot is as bright as possible and the beam pattern is of minimum depth.

He then notes the make and type of lamp and determines the proper stud 82 from a table of values. He registers that stud over pin 80 and clamps locknuts 72 and lens carrying frame 54 securely in position against it. This presets the testing device 50 in such manner that with accurate optical parts accurately aligned in the lamp, the top of the beam pattern would register on reference line 66.

He then notes the degree of deviation of the top of the beam from reference line 66. If the lamp incorporates a vertical as well as an axial focussing mechanism, he adjusts the bulb up or down until the top of the beam pattern registers on reference line 66. He then readjusts the axial focussing mechanism until the meter reading is a maximum.

If the lamp incorporates only an axial focussing mechanism and the deviation exceeds limit lines 68, he may turn the bulb over in the socket or try another bulb repeating the entire operation described in the three paragraphs above. The same would be true in the case of a lamp which incorporates no focussing means, except that in this case the meter reading should be noted for each bulb tried and an effort made to select a bulb which results in a high reading.

The beam pattern is next examined for defects. Excessive stray light above the hot spot usually means that the reflector is inaccurate. Hazy and indefinite hot spots usually indicate a frosted lens. A hot spot, deeper on one side of the target than on the other, indicates that the light source is off focus sideways.

Having completed the focussing operation, the final step is to aim the beams.

If the top of the beam pattern does not register accurately on reference line 66, the mechanic loosens up nuts 72, rotates the cylinder 76 until the blank aperture registers on pin 80 and slides the cylinder back as far as it will go. He then adjusts nuts 72 until the top of the beam pattern registers on line 66 and locks the test device in that position. Should the upper pattern extend above reference line 64, as sometimes happens with old style single-beam headlamps when the light source is above focus, a further adjustment in the angle of the test device is needed to register the top of that pattern on its line, letting the top of the lower pattern drop below reference line 66.

The mechanic then loosens up each of the headlamps at the universal joint ordinarily provided for the purpose. He inserts tie-bar 86 through bearings 84 on the testing device support. Insertion of the tie-bar is facilitated by rocking and rotating one headlamp while slipping the tie-bar through the bearing. This automatically locates the flutes on the headlamps in the vertical plane and lines up the axes of the headlamps in vertical planes parallel to the vertical plane through the longitudinal center line of the vehicle. It presupposes that asymmetrical beam headlamps such as are described and claimed in Falge and Godley Patent No. 1,929,111, granted October 3, 1933, will be produced with sufficient accuracy to insure proper aim sideways when the axis of the lamp is aimed straight ahead. It restricts movement of the headlamps to the one vertical plane, thereby facilitating adjustment. However, if desired, the connection between the test heads and the tie bar 86 may be such as to permit sidewise as well as up and down adjustment of the lamps to allow for variations in lateral aiming of asymmetric headlamps.

He next sets level adjustment screw 100, nearest the target, to compensate for variations in the level of the floor on which the vehicle stands. The proper setting is marked on the rear wall on each stall in which adjustments may be made.

He then sets level adjustment screw 100, nearest the lamp, for the level at which he wishes to locate the top of the beam with reference to the level of the surface on which the vehicle rests, considering the type of lighting provided by the lamp, the speed at which the vehicle is driven, whether the rear seat is usually loaded and the characteristics of the driver.

The final step consists in rocking the lamps forward or backward in their mountings until the bubbles are centered in the levels and then locking the lamps in position. This is best done by first setting up one lamp lightly with the bubble approximately centered, then setting up the other lamp securely with the bubble accurately centered, and then setting up the first lamp securely with the bubble accurately centered.

This completes the adjustment operation.

The light sensitive cell has the further possibility, when supplemented by a list of ratings on different types of lamps, that it may be used to check the efficiency of the lighting system. A low reading may indicate a reflector which has the silver polished off, a defective bulb, a frosted lens, a high resistance in the electrical system due to a poor contact or a poor ground, or a discharged or defective battery.

For best results, in some respects, the cell aperture 88 in the target is unfortunately placed in that it interferes with observation of the entire beam pattern. There are several variations which look interesting.

Figure 10:
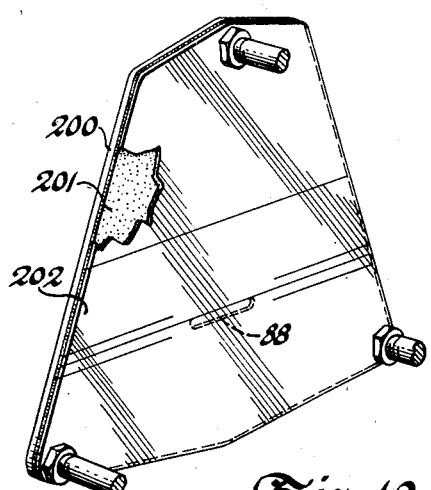
Figure 10 is a fragmentary view showing a modified form of target.

One variation is shown in Figure 10. Here the aperture 88 may be left in its present position, the target 200 painted black, its entire face covered with a diffusing sheet 201 of paper or other material which both reflects and transmits light, the reference lines to be marked on this diffusing sheet, the whole to be covered and protected against dirt and grease by a sheet 202 of transparent material such as glass or pyralin. In such a case the entire beam pattern would be visible but the amount of light which reaches the cell through the diffusing screen would be substantially reduced and the meter would have to be more sensitive.

Figure 11:
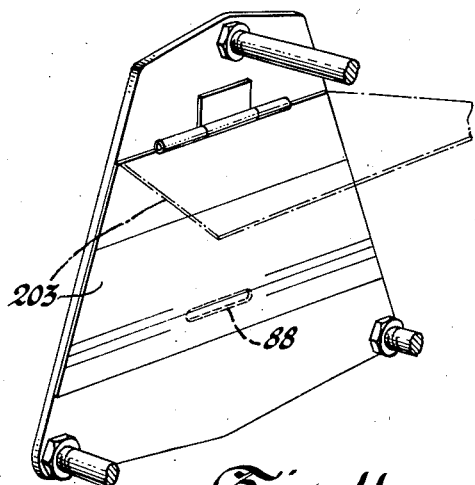
Figure 11 is a perspective view of a further modification of target.

Another alternative would be that of providing a supplementary metal target 203 with the reference lines on it as shown in Figure 11, arranged to cover the aperture 88 when in position and to swing out of the way or be removed when a cell reading is desired.

Figure 12:
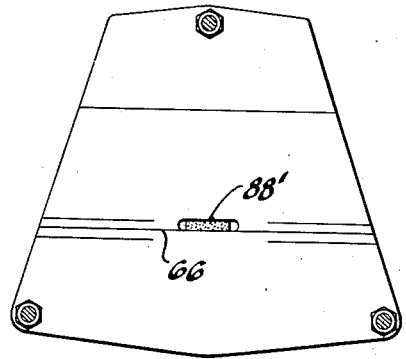
Figure 12 is a front elevation of another modification of target.

The aperture 88 might also be located somewhat higher on the target, necessitating a change in angle of test device each time it was used. If located with the lower edge of the opening on reference line 66 as shown at 88' in Figure 12, in addition to its use in focussing, the cell might be used in aiming to measure the quantity of stray light above the hot spot and hold the value down to certain limits.

Figure 13:
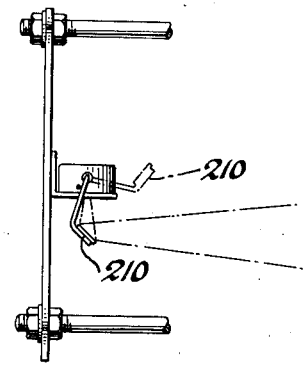
Figure 13 is a fragmentary side elevation showing a further modification of target.
Figure 14:
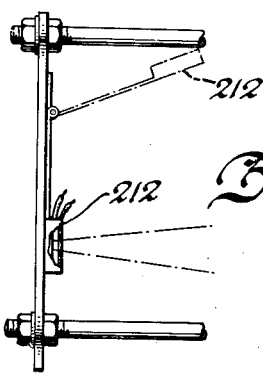
Figure 14 is a view similar to Figure 13 showing a further modification.

Instead of aperture 88 in the target, a removable mirror 210 might be used to reflect the light on the cell at some point between the lens holder and the target as shown in Figure 13. In such a case, the slot would have to be at the same distance from the lenses as the target. Or the cell might be pivoted or otherwise movable, as shown at 212 in Figure 14 so that it could be swung into position ahead of the target. In the latter case, however, a special cell would be needed which would locate the light sensitive diaphragm close to the target and thereby avoid error due to deviation from the focal point of lenses 60 and 62. In any event, the light which reaches the cell would have to be screened to provide the equivalent of slot 88.

In other respects, the described apparatus is capable of considerable modification in practice.

When used on a car assembly line, the device could be simplified substantially since it would have to handle only one type and size of lamp. In such a case, the lamps might be assembled to the device as a unit and the whole swung into position on the car after focussing and aiming with reference to each other. The assembly operation would then consist merely in bolting the two lamps to their supports with the bubble centered in the level.

I claim:

1. In headlamp testing apparatus, the combination of condensing lens means of sufficient size to encompass a large portion of the light from the center and sides of the headlamp, a screen, means for supporting the screen, substantially at the focus of the lens means to receive the beam pattern image projected thereby, said screen being freely exposed to view and having an opening centrally located in the beam pattern receiving portion thereof, and a photometer associated therewith having a light sensitive element arranged behind the opening, said opening being of such size as to receive only a portion of the image projected from the center of said headlamp and from adjacent portions of the sides of the headlamp so that the light intensity reading of said photometer will indicate separation or approach of the beams projected from the sides of the headlamp and consequently the accuracy of focusing of the light source in the headlamp.

2. Headlamp aligning apparatus comprising a pair of guideways, means for adjustably securing each of the guideways to a headlamp in predetermined relation to the lamp axis, said guideways being arranged on said securing means so as to be aligned when so secured with the headlamp axes in predetermined relation to each other, and a guide member adapted to be slidably received in said guideways when so aligned so as to hold them in aligned position.

3. In headlamp testing apparatus the combination of a pair of headlamp testing devices, means for adjustably securing each of said devices to a headlamp in predetermined relation to the lamp axis, each of said devices including a guideway arranged to be in lateral alignment with the guideway of the other device when the lamp axes are in predetermined relation to each other, and a guide member adapted to be slidably received in said guideways when so aligned so as to hold them in aligned position.

4. In a headlight testing apparatus the combination of a support, a test head comprising an unobstructed focusing lens and a screen spaced from the lens arranged to receive the image projected by the lens, said screen being exposed to view, means for mounting the test head on the support for pivotal adjustment about an axis at right angles to the axis of the lens, a level mounted on the test head and arranged with its axis parallel to the axis of the lens, and means for adjusting the angle of the level in a plane at right angles to the axis of movement of the test head, said last-named means comprising independently adjustable supporting devices engaging opposite ends of the level and adapted to be independently adjusted to tilt the level to compensate for different factors affecting aiming of the lamp.

5. In a headlight tester, the combination of a lens holder, a condensing lens in the holder, a screen substantially at the focus of the lens, spaced struts connecting the holder and screen in spaced relation and exposing the screen to view from all sides, and a level adjustably mounted on one of said struts.

6. In a headlight tester, a screen having a reference mark thereon, means for supporting the screen in spaced relation in front of one of the vehicle headlamps, a level arranged with its axis extending toward the screen, and means for mounting the level on said supporting means comprising independent vertically adjustable supporting devices engaging opposite ends of the level and arranged to be independently adjusted to tilt the level in a vertical plane to compensate for different factors affecting aiming of the lamp.

7. In the combination as defined in claim 6, said last-named devices each comprising two parts having adjustably threaded engagement with each other, one of said parts rotatably engaging one end of the level while the other part is secured to the said supporting means, and means adapted to engage said first-named part to hold it in adjusted position.

8. In a headlight tester, a test head comprising a screen, a lens holder, an unobstructed condensing lens in the holder, struts connecting the screen and the holder in spaced relation with the screen at the focus of the lens, said screen being exposed to view from substantially all sides, a level, and means for mounting the level on one of said struts comprising independent vertically adjustable supporting devices engaging opposite ends of the level and adapted to be independently adjusted to tilt the level in a vertical plane to compensate for different factors affecting aiming of the lamp.

9. In the combination as defined in claim 8, said last-named devices each comprising two parts having adjustably threaded engagement with each other, one of said parts rotatably engaging one end of the level while the other part is secured to the said supporting means, and means adapted to engage said first-named part to hold it in adjusted position.

10. In a headlight tester, the combination of a screen having a calibration mark thereon, a condensing lens, a skeleton frame connecting the lens and screen with the screen positioned at the focus of the lens, said frame permitting ready inspection of the screen from all sides, said lens being of sufficient size to encompass a substantial portion of the rays from the headlamp and being unobstructed so as to reproduce on the screen reduced in size but increased in intensity a considerable part of the beam pattern projected by the headlamp, a level, and means for mounting the level on said frame comprising independent vertically adjustable supporting devices engaging opposite ends of the level and adapted to be independently adjusted to tilt the level in a vertical plane, said level extending in the general direction of the light projected through said lens.

11. The combination of a headlight testing device including a holder, a plurality of condensing lenses mounted in said holder, each of said lenses being of sufficient size to encompass a large proportion of the rays of light from an automobile headlamp, said lenses being of substantially the same focal length and being arranged with their axes substantially parallel, a screen arranged substantially at the foci of said lenses, a frame rigidly connecting the holder and screen but freely exposing the screen to view, and means for adjustably supporting the testing device in front of an automobile headlamp with the lenses overlying the headlamp and the screen spaced forwardly therefrom, and with the optical axis of the testing device substantially alined with the optical axis of the headlamp.

12. In the combination as defined in claim 11, one of said lenses being arranged above the other and encompassing the major portion of the light from the upper portion of the headlamp.

13. In the combination as defined in claim 11, said lenses making contact with each other along one of the edges thereof, and being of sufficient area together to encompass the greater portion of the light from a headlamp.

14. In a headlight tester the combination of a pair of rigid plates, rods connecting said plates adjacent their margins and holding them in fixed parallel relation, one of said plates being apertured, a condensing lens mounted in said aperture of such focal length as to bring the rays passing therethrough to a focus on the other plate, said last-named plate having indicia thereon, threaded studs mounted in one of said rods and extending vertically upward, nuts threaded on said studs, a level having its opposite ends supported by said nuts, and means for yieldably holding the level in engagement therewith.

15. In the combination as defined in claim 14 said last-named means comprising a tension spring connecting the level and the rod between said studs.

16. In a headlight tester the combination of a support, a condensing lens mounted on the support, a light pattern receiving and displaying device, a light measuring device, means for mounting one of said devices on the support so as to have its light receiving portion adjacent the focus of the lens, and means for movably mounting the other of said devices on said support for movement between an operative position with its light receiving part in advance of the light receiving part of the first-named device and adjacent the focus of the lens and an inoperative position out of the path of the light rays.

17. In a headlight tester the combination of a support, a condensing lens mounted on the support, a screen mounted in said support for movement between an operative position at the focus of the lens and an inoperative position out of the path of the rays passing through the lens, and a light measuring device carried by the support in the rear of the screen in position to be exposed to the light passing through the lens when the screen is in out of the way position.

18. In headlight testing apparatus the combination of a support, a test head pivotally mounted on the support on a horizontal transverse pivot, said test head comprising a frame, a focusing lens and screen mounted on the frame in spaced relation, with the screen substantially at the focus of the lens, said lens being of sufficient size to encompass a large portion of the light from a headlamp so as to reproduce at its focus an image of a large portion of the beam pattern, said frame being constructed so as to freely expose the screen to view, said screen having an opening therein in the portion thereof receiving the beam pattern but of substantially less area than said pattern, and a photometer having its light sensitive element arranged behind said opening.

19. In headlight testing apparatus the combination of a support, a test head pivotally mounted on the support on a horizontal transverse pivot, said test head comprising a frame, a focusing lens and screen mounted on the frame in spaced relation, with the screen substantially at the focus of the lens, said lens being of sufficient size to encompass a large portion of the light from a headlamp so as to reproduce at its focus an image of a large portion of the beam pattern, said frame being constructed so as to freely expose the screen to view, a level mounted on the frame with its axis extending substantially parallel to the axis of the test head so as to determine the tilt of the projected beam, said screen having an opening therein in the portion thereof receiving the beam pattern but of substantially less area than said pattern, and a photometer having its light sensitive element arranged behind said opening.

20. In a headlight tester, a lens holder having a converging lens therein adapted to encompass the central zone of a headlamp so as to receive substantially all of the light forming the top of the beam, a screen arranged adjacent the focus of the lens so as to receive the image projected thereby and being freely exposed to view, means connecting the lens holder and screen in fixed relation, said lens being unobstructed so that substantially all of the light from said central zone is condensed by it on the screen, said screen having an aperture in the portion thereof receiving said image, said aperture being of substantially less area than the image, a light measuring device having a light sensitive element, said tester including means for supporting the light measuring device with its light sensitive element exposed in said aperture and facing said lens.

21. The combination of unitary supporting means for a headlamp tester comprising a clamping member adapted to engage the front of a headlamp, a clamping member adapted to engage the rear of the headlamp, means adjustably connecting said members to enable them to be moved toward each other to clamp a headlamp between them, spaced adjustable clamping means supported by one of said clamping members adapted to engage the headlamp on either side of its longitudinal axis to center the supporting means with respect thereto, means for adjusting said last-named means toward each other to clamp the headlamp between them, and a headlamp testing device carried by said first-named clamping member in front of said headlamp.

ROBERT N. FALGE.